BEST AVAILABLE COPY
No. 765,121. PATENTED JULY 12, 1904.
A. ZEIGER.
TRAP.
APPLICATION FILED JAN. 15, 1904.
NO MODEL.
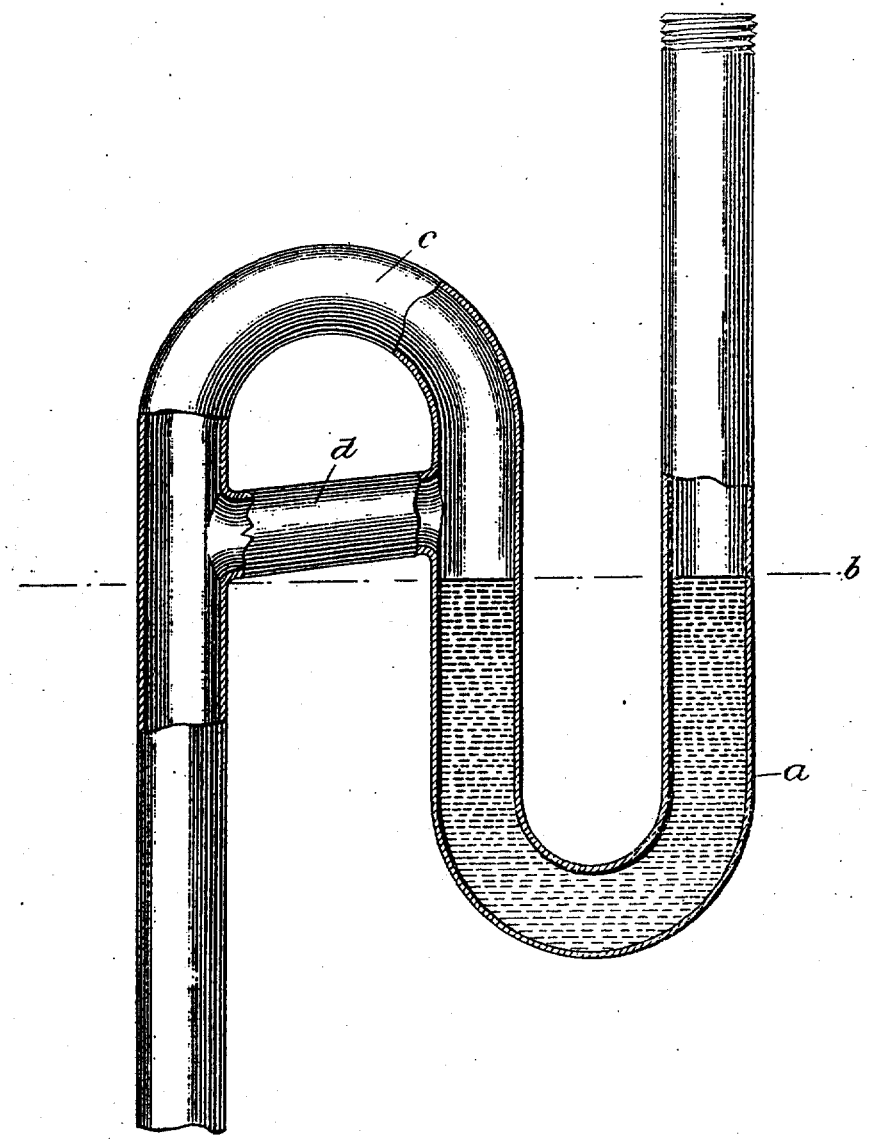
WITNESSES:
INVENTOR
Albert Zeiger
BY
ATTORNEYS No. 765,121.
Patented July 12, 1904.

UNITED STATES PATENT OFFICE.

ALBERT ZEIGER, OF NEW YORK, N. Y.

TRAP.

SPECIFICATION forming part of Letters Patent No. 765,121, dated July 12, 1904.

Application filed January 15, 1904. Serial No. 189,112. (No model.)

*To all whom it may concern:*

Be it known that I, ALBERT ZEIGER, a citizen of the United States, and a resident of the city of New York, borough of Brooklyn, in the county of Kings and State of New York, have invented a new and Improved Trap, of which the following is a full, clear, and exact description.

The object of this invention is to prevent the siphoning of the usual S-trap used in plumbing and the like. Ordinarily if the upper bend of these traps becomes filled with a solid column of water said column will establish a siphon which presses out from the trap its entire contents, thus defeating the very purpose for which the trap is designed. My invention seeks to overcome this disadvantage, and in carrying it out I provide the trap with a cross connection running in its upper bend at a point above the water-line in the trap, this connection forming, with the upper bend, a divided passage from the lower bend, and thereby preventing that suction on the water in the lower bend which will result in siphoning out the said water.

This specification is an exact description of one example of my invention, while the claim defines the actual scope thereof.

Reference is to be had to the accompanying drawing, forming a part of this specification, in which the figure represents a sectional elevation of the invention.

$a$ indicates the lower bend of the trap, which is intended to contain water to the height indicated by the letter $b$. $c$ indicates the upper bend, both of which parts $a$ and $c$ may be of the ordinary construction.

$d$ indicates the cross connection which passes between and communicates with the two limbs of the upper bend and lies just above the water-line $b$. This cross connection $d$ inclines down toward the outer limb (left hand in the drawing) of the trap, so as to drain all of the liquid from the cross-connecting pipe.

The cross-connecting pipe $d$ may or may not be of a capacity equal to that of the main part of the trap, and in the operation of the device as the water is discharged into the trap it will flow through it in the usual manner, a part of the water passing through the cross connection $d$ and the remainder passing up through the top bend in the usual manner. Assuming that the water lies in the pipe in an unbroken column from the cross connection $d$ outward or downward therefrom, it will be seen that this column will be incapable of exerting on the water within the lower bend of the trap that suction necessary to siphon out the water from said lower bend, since the upper bend of the trap and the cross connection $d$ cannot both be full of water at any time unless the water backs up in the trap. This is so by reason of the fact that the upper bend of the trap and the cross connection $d$ can obviously carry off more water than can pass through the lower bend $a$.

Screw-plugs will of course be fitted to the trap at the necessary points for allowing the trap to be cleaned easily and at will.

Various changes in the form, proportions, and minor details of my invention may be resorted to at will without departing from the spirit and scope thereof. Hence I consider myself entitled to all such variations as may lie within the intent of my claim.

Having thus described my invention, I claim as new and desire to secure by Letters Patent—

An S-shaped water-trap having a cross connection extending essentially horizontally from one limb of the upper bend to the other and lying above the normal water-line in the trap.

In testimony whereof I have signed my name to this specification in the presence of two subscribing witnesses.

ALBERT ZEIGER.

Witnesses:
 GEORGE DERINGER,
 ADAM CHRISTMANN, Jr.